US00RE39392E

(19) United States
(12) Reissued Patent
Bergin

(10) Patent Number: US RE39,392 E
(45) Date of Reissued Patent: Nov. 14, 2006

(54) LOCKING BRACKET AND CUPHOLDER FOR SEAT FRAME

(75) Inventor: Peter W. A. Bergin, Rancho Mirage, CA (US)

(73) Assignee: Caddy Products, Inc., Thousand Palms, CA (US)

(21) Appl. No.: 10/985,831

(22) Filed: Nov. 10, 2004

Related U.S. Patent Documents

Reissue of:
(64) Patent No.: 6,641,101
Issued: Nov. 4, 2003
Appl. No.: 09/874,830
Filed: Jun. 5, 2001

(51) Int. Cl.
*A47K 1/08* (2006.01)

(52) U.S. Cl. ..... 248/311.2; 248/223.41; 297/188.14; 297/188.18

(58) Field of Classification Search ..... 248/311.2, 248/313, 220.22, 224.7, 212, 223.41, 223.31; 297/188.18, 188.14, 188.2
See application file for complete search history.

(56) References Cited

U.S. PATENT DOCUMENTS

| | | | | |
|---|---|---|---|---|
| 898,091 | A | 9/1908 | Carney | 312/248 |
| 1,149,541 | A | 8/1915 | Rees et al. | 297/188.05 |
| 1,602,261 | A | 10/1926 | Hill | 248/298.1 |
| 1,680,469 | A | 8/1928 | Morgan | 248/297.1 |
| 1,989,974 | A | 2/1935 | Elias | 248/205.1 |
| 2,132,331 | A | 10/1938 | Wanamaker | 182/129 |
| 2,202,365 | A | 5/1940 | Feman | 248/311.2 |
| 2,217,553 | A | 10/1940 | Huettenrauch | 220/620 |
| 2,319,109 | A | 5/1943 | Bullock | 482/148 |
| 2,364,647 | A | 12/1944 | O'Connor | 297/452.33 |
| 2,471,030 | A | 5/1949 | Foulke | 211/75 |
| 2,517,829 | A | 8/1950 | Beckowich | 248/311.2 |
| 2,532,162 | A | * 11/1950 | Goss | |
| 2,579,889 | A | 12/1951 | Weinberg | 40/538 |
| 2,706,516 | A | * 4/1955 | Nordmark | 155/188 |
| 2,807,315 | A | 9/1957 | Manne | 297/188.06 |
| 3,041,107 | A | 6/1962 | Schaefer | 297/248 |

(Continued)

OTHER PUBLICATIONS

Defendant's (American Seating Co.) Answer—Civil Action No. 0:05–cv–00800–RHK–AJB, in the U.S. District Court for the District of Minnesota—Document No. 3 filed Jul. 22, 2005.

Amended Complaint for Patent Infringement (Jury Trial Demanded)—Civil Action No. 0:05–cv–00800–RHK–AJB, in the U.S. District Court for the District of Minnesota—Document No. 41 filed Jan. 16, 2006.

Defendant's (American Seating Co.) Answer to Amended Complaint and Counterclaim—Civil Action No. 0:05–cv–00800–RHK–AJB, in the U.S. District Court for the District of Minnesota—Document No. 43 filed Jan. 17, 2006.

*Primary Examiner*—Ramon O Ramirez
(74) *Attorney, Agent, or Firm*—Westman, Champlin & Kelly, P.A.

(57) ABSTRACT

A bracket is used for mounting onto the standard of a stadium or theater seat. The bracket can be bolted in place at the same time as seat backs are bolted onto the seat standard. The bracket has latches that permit a drink cupholder to be installed by sliding the cupholder along mating guides in one direction. The latches engage complementary latch portions on the drink cupholder to prevent removal of the drink cupholder. The drink cupholder has a wall that mates to the bracket, and includes skirt walls that cover the bolts used for attaching the bracket and the seat backs to the seat standard.

25 Claims, 6 Drawing Sheets

U.S. PATENT DOCUMENTS 3,172,713 A 3/1965 Rupert ..... 312/235.7
3,215,467 A 11/1965 McFarland ..... 297/188.15
3,526,314 A 9/1970 Trammel ..... 224/275
3,565,384 A 2/1971 Lockwood ..... 248/312
D227,858 S * 7/1973 Goldman et al. ..... D8/233
3,881,677 A 5/1975 Ihlenfeld ..... 248/311.2
4,063,701 A 12/1977 Wray ..... 248/292.14
4,088,848 A * 5/1978 Weed ..... 179/146 R
4,161,265 A 7/1979 Hauser et al. ..... 222/181.2
4,262,962 A * 4/1981 Yust ..... 297/194
4,461,445 A 7/1984 Williamson et al. ..... 248/551
4,697,780 A * 10/1987 Wenkman et al. ..... 248/558
4,721,276 A * 1/1988 Moss ..... 248/311.2
4,844,400 A 7/1989 Jasmagy, Jr. ..... 248/311.2
4,863,134 A 9/1989 Young et al. ..... 248/311.2
4,865,237 A * 9/1989 Allen ..... 224/42.45 R
D307,852 S * 5/1990 Clark ..... D7/620
5,035,389 A 7/1991 Wang ..... 248/224.51
5,086,958 A 2/1992 Nagy ..... 224/544
D328,223 S * 7/1992 Clark ..... D7/622
5,219,140 A * 6/1993 Spykerman ..... 248/311.2
5,232,262 A 8/1993 Tseng ..... 297/188.17
5,234,251 A 8/1993 Ayotte ..... 297/194
5,238,212 A * 8/1993 Dechellis ..... 248/311.2
D342,871 S * 1/1994 Stern et al. ..... D7/620
D345,906 S * 4/1994 Schmidt et al. ..... D8/373
5,302,000 A * 4/1994 Ayotte ..... 297/194
5,320,319 A 6/1994 Winger et al. ..... 248/312.1
5,320,406 A 6/1994 North ..... 297/188.14
D350,259 S 9/1994 Ayotte et al. ..... D7/620
5,356,038 A 10/1994 Banks ..... 222/105
5,356,107 A 10/1994 Sinohuiz ..... 248/311.2
D353,289 S 12/1994 Ayotte et al. ..... D6/510
5,395,085 A * 3/1995 Mann ..... 248/311.2
D357,613 S 4/1995 Schultz ..... D7/620
5,421,638 A * 6/1995 Ayotte et al. ..... 297/188.04
5,435,511 A * 7/1995 Hsu ..... 248/206.3
D365,250 S 12/1995 Bergin et al. ..... D7/620
5,474,272 A * 12/1995 Thompson ..... 248/311.2
D367,997 S 3/1996 Ayotte et al. ..... D7/620
D368,628 S * 4/1996 Bergin ..... D7/620
5,533,782 A * 7/1996 Goldman ..... 297/188.18
D377,439 S 1/1997 Ayotte et al. ..... D7/620
5,628,103 A 5/1997 Ayotte et al. ..... 29/525.01
D380,125 S 6/1997 Ayotte et al. ..... D7/620
D380,652 S 7/1997 Ayotte et al. ..... D7/620
D383,362 S 9/1997 Ayotte et al. ..... D7/620
5,709,057 A * 1/1998 Johnson, Jr. ..... 52/301
5,709,429 A * 1/1998 Bergin ..... 297/188.04
D398,127 S 9/1998 Bergin et al. ..... D34/27
5,813,644 A * 9/1998 Bergin ..... 248/311.2
5,813,646 A 9/1998 Bartholomew ..... 248/311.2
D400,678 S 11/1998 Clark et al. ..... D34/27
5,850,996 A 12/1998 Liang ..... 248/221.11
5,873,555 A * 2/1999 Crace ..... 248/312.1
5,938,091 A 8/1999 Bergin et al. ..... 224/411
5,947,322 A 9/1999 Ho ..... 220/477
D423,836 S 5/2000 Bergin ..... D6/501
D425,012 S 5/2000 Bergin ..... D12/419
6,062,518 A * 5/2000 Etue ..... 248/231.21
6,109,580 A 8/2000 Stern et al. ..... 248/311.2
6,186,382 B1 * 2/2001 Bergin ..... 224/411
6,283,042 B1 9/2001 Wargo et al. ..... 108/26
6,283,551 B1 9/2001 Bergin ..... 297/411.35
6,315,182 B1 11/2001 Chen ..... 224/420
6,354,551 B1 * 3/2002 Oxley ..... 248/311.2
D456,691 S 5/2002 Bergin ..... D8/354
6,457,772 B1 * 10/2002 Forston ..... 297/188.14
6,478,371 B1 * 11/2002 Clarke ..... 297/188.11
6,520,576 B1 2/2003 Burns et al. ..... 297/188.14

* cited by examiner

LOCKING BRACKET AND CUPHOLDER FOR SEAT FRAME

Matter enclosed in heavy brackets [ ] appears in the original patent but forms no part of this reissue specification; matter printed in italics indicates the additions made by reissue.

BACKGROUND OF THE INVENTION

The present invention relates to a drink cupholder on the seat standard or frame of stadium seats, which includes a separate mounting bracket that can be preinstalled on the standard, before the seat backs are put into place and using bolt holes that are also used for mounting the seat backs in place. The mounting bracket can be installed, and later the seat backs can be installed. A separate drink cupholder is fitted into the place on the mounting bracket as a final step and locks in position covering the bolts used for mounting the mounting bracket and sent back to prevent tampering.

In the prior art, drink container holders or drink cupholders have been advanced, and have become very popular in stadium seating for theaters, sports arenas and the like. The cupholders generally are mounted at the rear of the seat backs, so that they are accessible and useable for persons seated in the row behind the row of seats on which the cupholders are mounted. Also, separable mounting brackets and drink cupholders have been shown in the prior art. For example, U.S. Pat. No. 5,813,644, illustrates such a cupholder. Improvements in the ease of mounting, and the procedures for enabling one to install a mounting bracket at the time the seat standards are installed into the arena, and then later adding the drink cupholders, while insuring that the drink cupholders are secured in place is important. Tampering with drink cupholders can be a problem, and the cupholder of the present invention covers the bolts that attach the mounting bracket to the seat standard when the drink cupholder is snapped into place. This construction will discourage, and essentially eliminate, removal of the brackets and the drink cupholder.

The bracket and the drink cupholder can be molded out of suitable plastic materials, and provide an attractive, easily installed, and relatively tamper proof assembly.

SUMMARY OF THE INVENTION

The present invention relates to a mounting bracket and a drink cupholder that are separately made, and which are installed on the standards or frames for mounting the bracket stadium seats. The mounting bracket is adapted to snap into place on the arm support between a pair of seats. the mounting bracket extends to the rear of such standard. Molded or formed seat standards can have various curved shapes, and the present mounting bracket can easily be adapted to such curves for fitting into place, particularly along flanges at the rear of the seat standard. The seat backs are installed on provided supports at the rear of the standard with suitable bolts. The same bolts are used for securing the mounting bracket in place, so the mounting brackets can be mounted and secured at the time the seat backs are installed.

The drink cupholder that attaches to the mounting bracket can be installed at a later time by sliding it onto a provided guide wall so it snaps and latches in place. The drink cupholder is than non-removably attached without utilizing special tools. Attaching the mounting bracket to the standard at the time of installing the seat backs, makes the installation process easier.

Since the drink cupholder can be installed at a later time, it is made to shield the mounting bolts that are used for attaching the mounting bracket on the seat standard. Once the drink cup or drink cupholder has been snapped into place, the mounting bolts are not accessible from the rear but the drink cupholder is accessible to a person sitting in a seat row behind the row of seats on which the drink cupholder is installed.

Different versions of drink cupholders can be installed on the same mounting bracket, depending on the use that is desired. Each drink cupholder has a guide or slide that has recesses that mate with the lugs on the mounting bracket.

The mounting bracket is easily molded, and the drink cupholders also are molded so that they can be made rugged, in suitable colors, and with pleasing shapes.

DETAILED DESCRIPTION OF THE PREFERRED EMBODIMENTS

Figure 1:
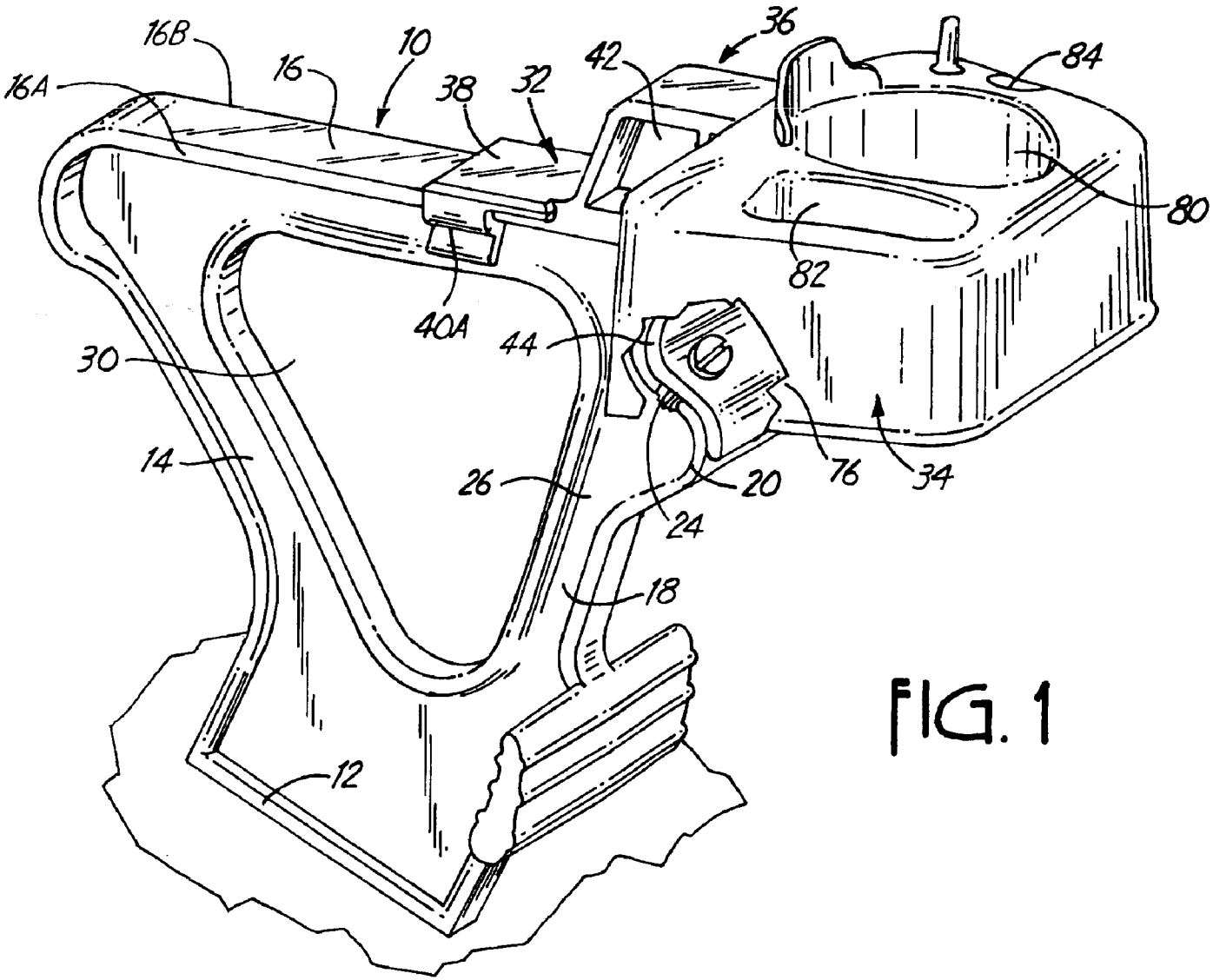
FIG. 1 is a perspective view of the typical seat standard having a drink cupholder mounting bracket and drink cupholder installed thereon, with the seat backs removed.
Figure 2:
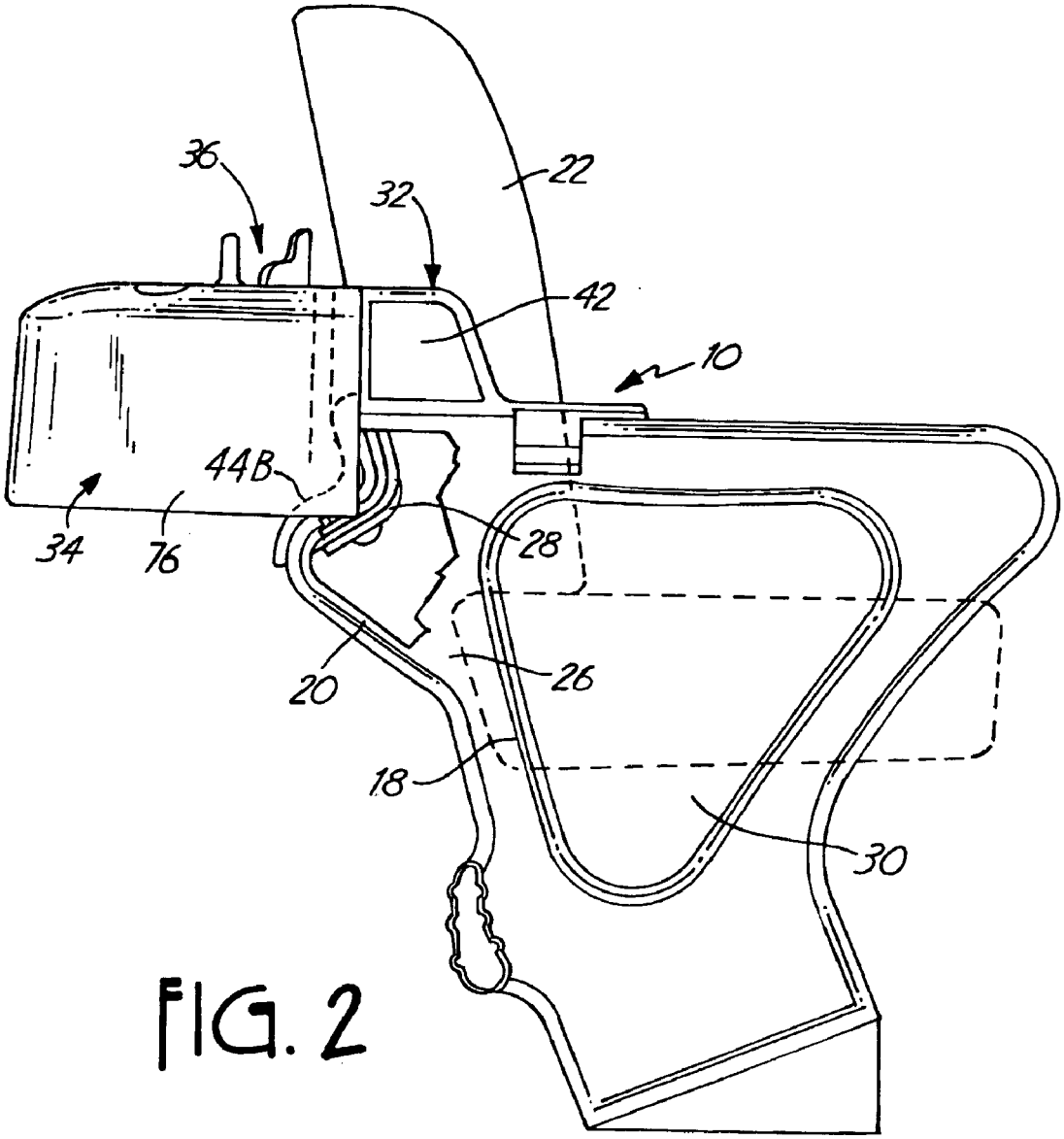
FIG. 2 is a side elevational view of the standard of FIG. 1 fragmentarily showing a seat back in dotted lines in position for illustrative purposes.

As shown in FIGS. 1 and 2, in particular, a stadium seat standard indicated generally at 10 is for mounting seats in a conventional manner in a stadium seating arrangement. The seats are not shown in detail, in that they can be of any suitable design. The standard 10 includes a base 12 that mounts onto a suitable support, such as a poured concrete floor of a stadium, and has frame uprights 14 at the front edge that curve upwardly to a top flange 16. The rear side of the standard has rear upright 18, with a mounting flange 20 that is used for mounting a seat back 22, as shown schematically in FIG. 2. The seat back 22 has suitable brackets 28 that fit against the inner surface of the flange 20 in alignment with slots 24 on the mounting flange.

The flange 20 extends on opposite sides of a center panel 26, and there is a slot 24 on each of the extending side portions of the flange 20. The flange 20 and panel 26 can be curved at the rear side, as desired, and the brackets 28 used for mounting the seat backs fit this curvature.

The top flange 16, extends on opposite sides of the center panel 26, as shown, and various openings 30, can be provided. The side portions 16A and 16B of the top flange are used for supporting a mounting bracket 32 for a drink cupholder 34 in a drink cupholder assembly 36.

Figure 3:
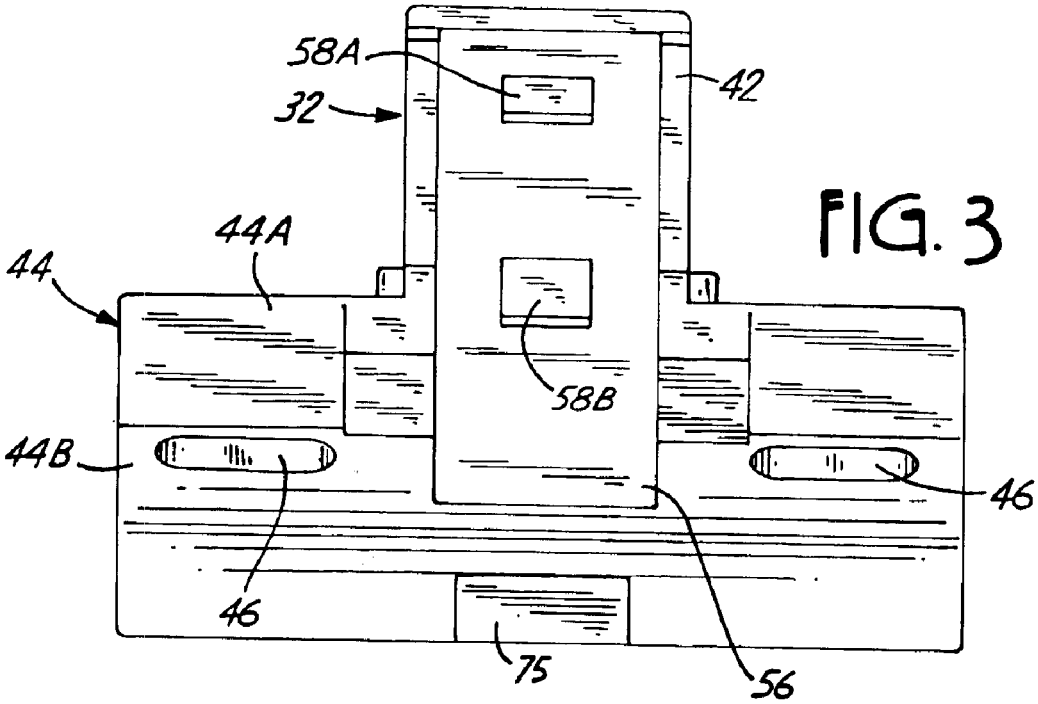
FIG. 3 is a rear end view of a mounting bracket.
Figure 4:
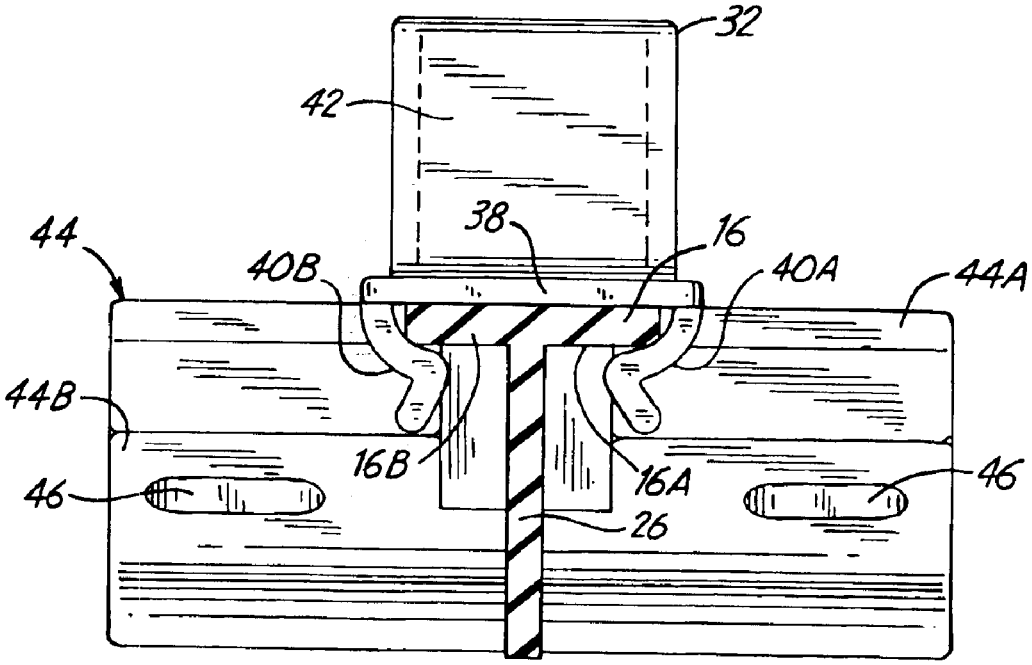
FIG. 4 is a view of the end of the mounting bracket opposite from FIG. 3, that would be installed on the seat standard.

The mounting bracket 32 is shown in greater detail in FIGS. 3 and 4, and includes a horizontal top wall 38 that rests above the flange 16, and has snap on resilient latch fingers 40A and 40B on the two sides of the top wall 38, respectively, that fit over edges of the side flanges 16A and 16B of the top flange 16 on the seat standard.

The top wall 38 joins a support head 42 that is positioned at the rear side of the mounting bracket 32. The supported 42 in turn is joined to a support wall 44 that is molded in two wall sections 44A and 44B, to conform to the upper portions of the flange 20 at a rear side of the standard 10. The wall 44 is provided with bolt openings or slots 46 in the lower support wall section 44B that is resting on a portion of the flange 20 carrying the slots 24 for the bolts 50 which are used for mounting the seat backs 22, and which also are used for attaching the mounting bracket 32 in position.

The support head 42 supports a generally planar upright track or wall 56 that is joined to the support head [40] *42* with a block or web 54. The wall 56 has two latch lugs 58A and 58B formed thereon. The lugs 58A and 58B taper outwardly in downward direction and form downwardly facing shoulder surfaces 60A and 60B, respectively. The planar wall 56 mates with latch slide guides 62 at the back of the drink cupholder 34.

Figure 5:
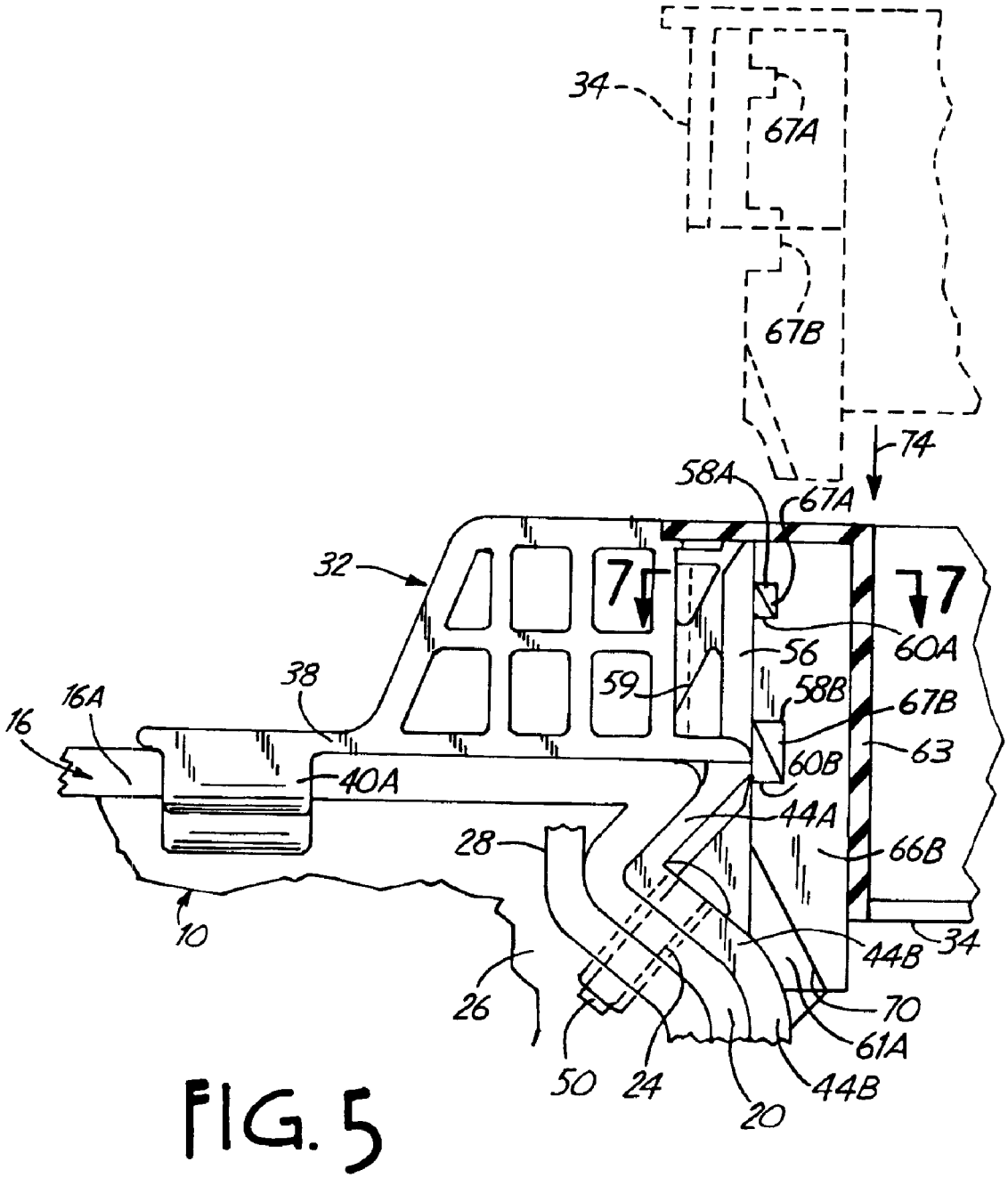
FIG. 5 is a side elevational view showing the drink cupholder latched into place on a mounting bracket.
Figure 6:
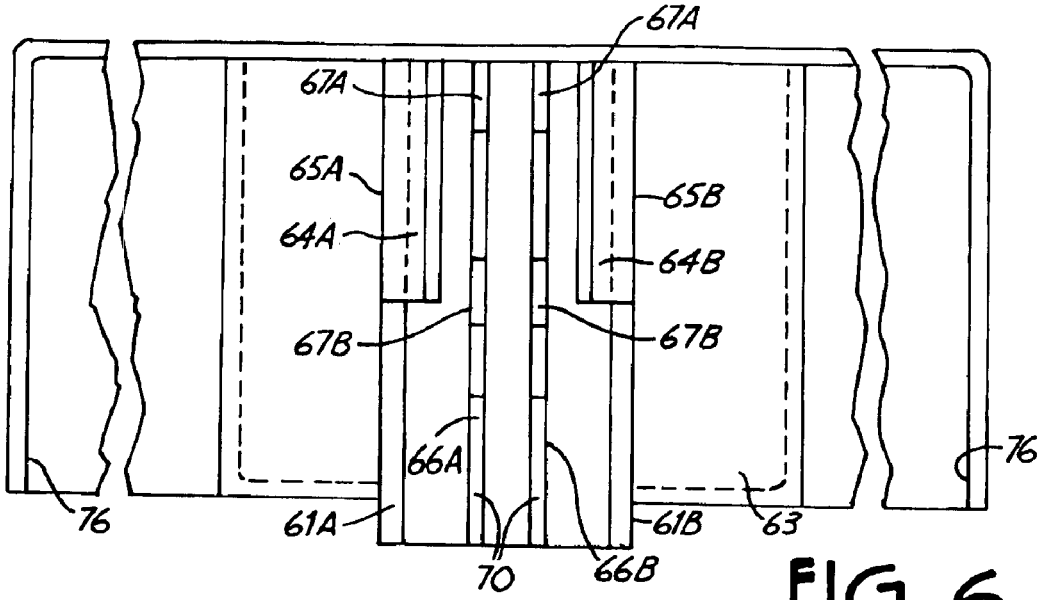
FIG. 6 is a back side view of the drink cupholder showing the receptacles that latch onto lugs on the mounting bracket.
Figure 7:
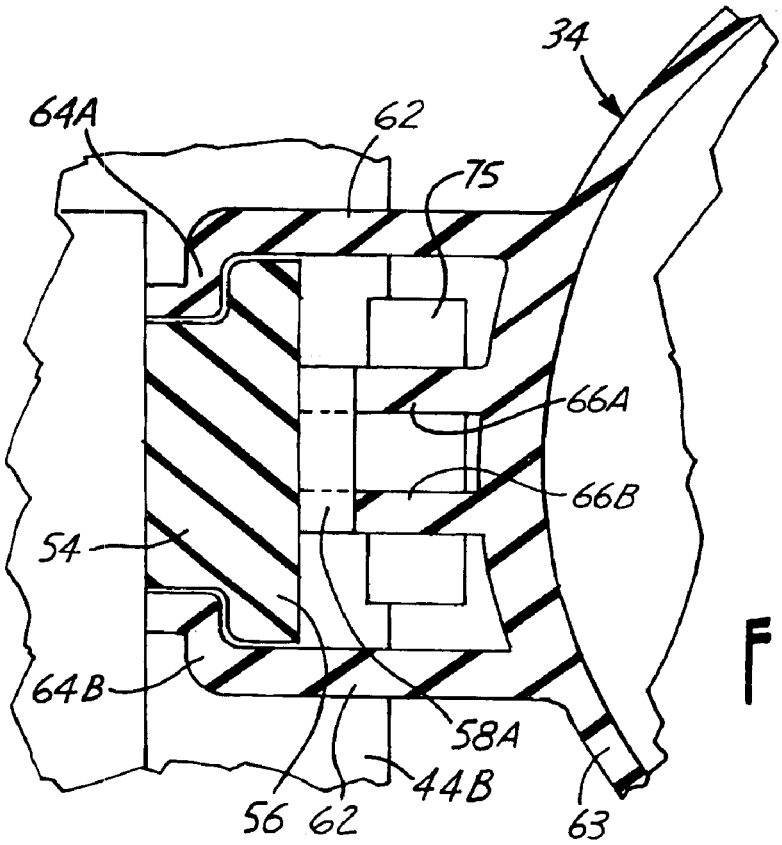
FIG. 7 is a fragmentarily enlarged sectional view of the mating parts for mounting the drink cupholder on the mounting bracket taken on line 7—7 in FIG. 5.

The back of the drink cupholder 34 has a pair of spaced side walls 61A and 61B that have upper portions 65A and 65B extending laterally from the wall 63 forming the cup receiving cylinder a greater distance than the lower portions of the wall (see FIGS. 5, 6 and 7 in particular). The upper portions 65A and 65B have inwardly turned flanges 64A and 64B that fit over the side edges of the upright track or wall 56. When the cupholder 34 is to be installed on the mounting bracket 32, the cupholder 34 is raised above the wall 56 as shown in dotted lines in FIG. 5, so that the flanges 64A and 64B are to the front side of the edges of the wall 56, and then the cupholder 34 is slid downwardly and guided along wall 56.

The wall 33 of the cupholder 34 also has a pair of latch walls 66A and 66B between the side walls 61A and 61B. The latch walls 66A and 66B have latch recesses 67A and 67B which have upwardly facing shoulder surfaces that lock under shoulders 60A and 60B of the lugs 58A and 58B for locking the cupholder 34 in place. The latch walls 66A and 66B have edges that will slide along the tapered surfaces of the lugs 58A and 58B respectively, when the cupholder is moved downwardly in the direction indicated by the arrows 74. The lower ends of latch walls 66A and 66B are tapered as shown in 70 in FIG. 5 to aid in assembly as the cupholder is slid into place. The flanges 64A and 64B will flex so that the latch walls will ramp or slip over the lugs 58A and 58B on wall 56 upon the application of a reasonable amount of force in the direction of arrow 74. The lugs 58A and 58B will snap into the latch recesses and the cupholder 34 is locked on the mounting bracket. The latch is a one-way latch. The lower end of wall 44B has a center stop lug 75 that will prevent the cupholder 34 from being slid too far downwardly.

The cupholder 34 has side skirts 76 that are spaced apart enough and have vertical length sufficient go over the ends of wall 44 and to cover the bolts 50 on both sides of the bracket 32. The side skirts 76 shield the bolts 50 from removal at the rear of the standard 10 unless the cupholder is forced off. Generally, the removal of the cupholder 34 will cause destruction of the mounting bracket or the cupholder, unless a special tool is used for resiliently bending the walls 56 and 62 to permit the lugs 58A and 58B to be released from recesses 67A and 67B.

The cupholder 34, as shown, can be in different forms. As shown in FIG. 1, the cupholder has a cup or container receptacle 80 formed by cylindrical wall 63 and also side pockets or receptacles 82 for holding various items such as a small program, or other written materials, and can have a receptacle 84 for a pen or pencil.

Figure 8:
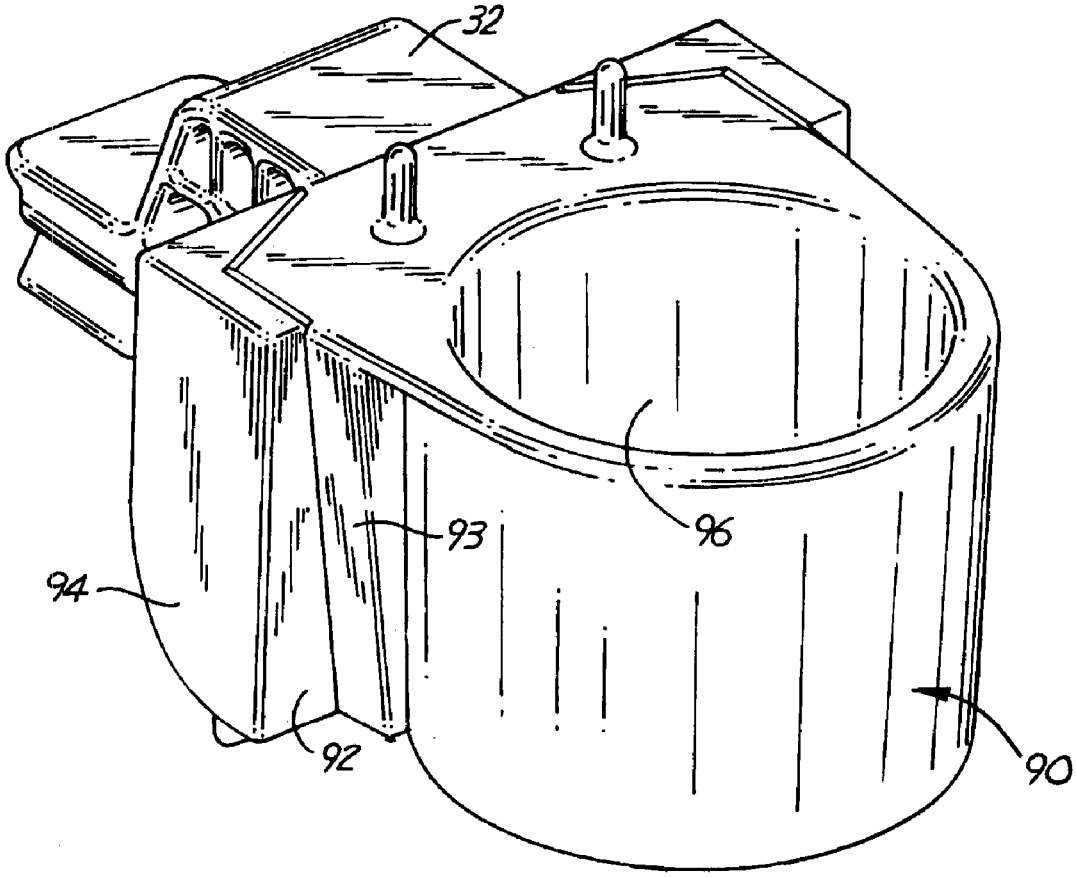
FIG. 8 is a perspective front view of a modified view of the drink cupholder shown installed on a bracket.

In FIG. 8, a modified version of the cupholder is shown at 90, installed on a mounted bracket 32. The cupholder 90 has side flanges or walls 92 that extend laterally from the main body 93 of the attachment block. The flanges 92 support rearwardly extending skirts 94 that cover the ends of the flange 20 on the standard, and the ends of the wall 44 of the mounting bracket 32, to completely shield the bolts 50, and the mounting slots or openings. The cupholder or drink container holder 90 has a receptacle 96 that receives a cup. A top wall 98 is also provided. The mounting block 93 has guides, as shown in FIG. 7. The mounting block also includes latch receptacles to receive the lugs 58A and 58B.

The mounting bracket 32 can be used for various styles of cupholders, as shown. This makes the final design of the cupholder adaptable to the particular installation that is desired. The cupholders do not have to be installed until the end of construction of the stadium. The mounting brackets themselves can be mounted at the time the standards are put in or when the seat backs are put into place.

Although the present invention has been described with reference to preferred embodiments, workers skilled in the art will recognize that changes may be made in form and detail without departing from the spirit and scope of the invention.

What is claimed is:

1. A mounting bracket for *supporting* a drink cupholder to fit onto a seat standard, said seat standard having an upper armrest wall and a rear facing wall, [a] *the* bracket for supporting said drink cupholder having a mounting wall supportable on the upper armrest wall of the standard, and the bracket having a support wall extending on the rear side of the standard, said support wall having openings for receiving bolts used for connection with the standard, a guide wall for slidably receiving said drink cupholder when the drink cupholder is moved in a first direction to a first portion of the guide wall having at least one latch lug that mates with the drink cupholder to prevent removal of the drink cupholder in a second direction opposite from the first direction.

2. The bracket of claim [1] *16*, wherein said at least one latch lug has *a* tapered ramp surface[s] sloping outwardly from the [support] *guide* wall [in the first direction,] and the at least one latch lug forming a shoulder generally perpendicular to the [support] *guide* wall [facing in the first direction] *to restrict removal of the drink cupholder*.

3. The bracket of claim [1] *16*, wherein said support wall has a central plane extending along a central plane of the seat standard, and said support wall has laterally extending portions extending laterally of the central plane of the seat standard, the support wall having said *opening or* openings for [bolts] *the fasteners* on the laterally extending portions of the support wall.

4. The bracket of claim [1] *16*, wherein [said standard][upper armrest wall has lateral flanges on the sides thereof, and] *the mounting portion includes* flexible retainer clips [on the mounting bracket] for snapping onto [the lateral flanges and retaining the mounting wall of the bracket on the] *an* upper armrest [wall] of the *seat* standard.

5. The bracket of claim [1] *16*, in combination with [a] *the* drink cupholder having a receptacle for holding a drink cup *or container*, the drink cupholder having a holder wall *including a complimentary portion on the holder wall* [mating with] *and* the *at least one latch lug on the* [support] *guide* wall of the bracket *being mateable with the complimentary*

*portion* [, and a complementary surface on the mating wall for engaging the latch lug on the support wall] *to secure the cupholder relative to the bracket.*

6. The combination of claim 5, wherein *a relative width or dimension of* said drink cupholder [wall extends laterally to overlie] *is sized to obscure the fastener opening or openings on* the support wall *when the drink cupholder is latched to the bracket.*

7. The combination of claim 5, wherein said holder wall of said drink cupholder conforms in a complementary shape to at least one portion of the support wall of the bracket.

8. The bracket of claim [1] *16*, wherein the support wall has a lower part comprising a first wall section extending downwardly and rearwardly and a second wall section extending downwardly and forwardly from the first wall section.

9. The bracket of claim [8] *16*, wherein the *guide wall of the* mounting bracket [has an upright track wall with] *is formed between* lateral edges [defining] *of* a track [, the first and second support wall sections being wider laterally than the track wall,] *and* the *at least one* latch lug[s being] *is* on the [track] *guide* wall *along the track.*

10. The bracket of claim 9, wherein the drink cupholder is used in combination with the bracket, the drink cupholder having [attachment walls mating with the track wall, said drink cupholder wall having] *spaced* guides *portions* [along opposite sides thereof for engaging] *slideable along the lateral edges of* the track [defined by the lateral edges of the track wall,] and [a recess on] the drink cupholder *including a recess* which aligns with and receives the *at least one* latch lug on the [track] *guide* wall of the mounting bracket when the drink cupholder is [moved to receive] *slid along* the track.

11. A mounting bracket for *mounting* a drink cupholder *relative* to [fit onto] a seat standard[, the seat standard having an upper armrest wall and a rear wall on a rear side of the standard, the mounting bracket including a mounting wall supportable on the upper armrest wall of the standard, and on the rear wall on the rear side of the standard,] *comprising* at least one wedge lug *having a wedge surface sloped in a first direction* on [the rear wall, said rear wall having] a *latch* portion *of the mounting bracket* that is defined by generally vertical side edges, in combination with a cupholder having a cupholder wall [with] *and* guides engaging the *generally* vertical side edges of the [rear wall to retain the cupholder on the rear wall,] *latch portion of the mounting bracket as the cupholder is slid along the generally vertical side edges in the first direction* and the cupholder wall having a surface formed to [face and] mate with the *at least one wedge* lug on the [rear wall] *latch portion of the mounting bracket* [as the cupholder is slid along the rear wall vertical side edges] to prevent removal of the cupholder *in a second direction opposed to the first direction.*

12. The mounting bracket of claim 11, wherein [there is] *the bracket includes* a stop lug on the [rear wall] *latch portion of the mounting bracket* to prevent the cupholder from moving more than a selected amount when the cupholder is slid along the [rear wall] vertical side edges.

13. The mounting bracket of claim 11, wherein the bracket has a *mounting portion including a* support wall with laterally extending portions [at a lower end of the support wall that extend outwardly from the rear wall,] said laterally extending portions having openings for receiving fasteners [for] *to* [securing] *secure* the mounting bracket to the seat standard.

14. The mounting bracket of claim 13, wherein said cupholder has *a* skirt portion[s] that extend laterally outwardly beyond the support wall laterally extending portions to shield the fasteners.

15. A molded cupholder having a cupholder wall and a mounting portion, said mounting portion including a planar base wall having at least one wedge shaped latch having an inclined planar surface protruding outwardly from a plane surface of the planar base wall, and an outer end of the inclined planar surface forming a latch surface extending substantially perpendicularly from and joining the planar base surface, the wedge shaped latch positioned to engage a mating wedge shaped latch on a bracket on a seat standard, the cupholder mounting portion including a pair of spaced side shield walls that are on opposite sides of the base wall and extend outwardly from the plane surface, the spaced shield walls having inturned flanges at *an* outer end thereof for slidably receiving edges of a support wall on the bracket on the seat standard, the latch surface of the wedge shaped latch on the base wall and a similar latch surface on a mating wedge shaped latch engaging as the side shield walls are slid along the support wall, and the side shield walls, the support wall and base wall enclosing the wedge shaped latch on the base wall and the mating wedge shaped latch.

*16. A mounting bracket for a drink cupholder to fit onto a seat standard, the bracket comprising a mounting portion including a support wall having an opening or openings for receiving fasteners used for connection to the seat standard and a guide wall having at least one latch lug and the drink cupholder being slidable along the guide wall in a first direction so that the at least one latch lug mates with the drink cupholder to prevent removal of the drink cupholder in a second direction different from the first direction.*

*17. A molded cupholder comprising a cupholder portion and a bracket mountable on a seat standard and the bracket having at least one wedge shaped latch having an inclined planar surface protruding outwardly from a surface of the bracket and the cupholder portion including a latch surface extending substantially perpendicularly to a holder wall to engage or interface with the wedge shaped latch on the bracket, the cupholder portion including a pair of spaced side shield walls that are on opposite sides of the holder wall and extend outwardly from a surface of the holder wall, the spaced shield walls having inturned flanges at outer end thereof for slidably receiving edges of a guide wall on the bracket, the wedge shaped latch on the bracket and the latch surface on the cupholder engaging as the side shield walls are slid along the guide wall to restrict withdrawal of the cupholder portion from the bracket.*

*18. The cupholder of claim 17 wherein the bracket includes a mounting portion having a fastener opening or openings.*

*19. The cupholder of claim 18 wherein a dimension or width of the cupholder portion obscures the fastener opening or openings when the cupholder portion is latched to the bracket.*

*20. A cupholder comprising:*

*a mounting bracket mountable to a seat standard including at least one fastener opening;*

*a cupholder portion having a holder receptacle; and*

*a latching mechanism to releasably latch the cupholder portion to the mounting bracket by sliding the cupholder portion along the mounting bracket to engage the latching mechanism to latch the cupholder portion to the mounting bracket to restrict removal of the cupholder portion from the mounting bracket wherein the cupholder portion is sized to obscure the at least one fastener opening when the cupholder portion is latched to the mounting bracket.*

*21. A cupholder comprising:*

*a mounting bracket mountable to a seat standard;*

*a cupholder portion having a holder receptacle; and*

*a latching mechanism to releasably latch the cupholder portion to the mounting bracket by sliding the cupholder portion along the mounting bracket to engage the latching mechanism to latch the cupholder portion to the mounting bracket to restrict removal of the cupholder portion from the mounting bracket wherein the cupholder portion includes spaced guide or flange portions slidable along a guide wall of the mounting bracket to engage the latching mechanism.*

*22. The cupholder of claim 21 wherein the mounting bracket includes at least one fastener opening.*

*23. A cupholder comprising:*

*a mounting bracket mountable to a seat standard including at least one fastener opening;*

*a cupholder portion having a holder receptacle; and*

*a latching mechanism to releasably latch the cupholder portion to the mounting bracket by sliding the cupholder portion along the mounting bracket to engage the latching mechanism to latch the cupholder portion to the mounting bracket to restrict removal of the cupholder portion from the mounting bracket wherein the latching mechanism includes wedged shaped latch lug and a transverse surface orientated to engage the wedged shaped latch lug to restrict removal of the cupholder portion latched to the mounting bracket.*

*24. A cupholder comprising:*

*a mounting bracket mountable to a seat standard;*

*a cupholder portion having a holder receptacle; and*

*a latching mechanism to releasably latch the cupholder portion to the mounting bracket by sliding the cupholder portion along the mounting bracket to engage the latching mechanism to latch the cupholder portion to the mounting bracket to restrict removal of the cupholder portion from the mounting bracket wherein the latching mechanism includes a portion which flexes as the cupholder portion is slid along the mounting bracket to engage the latching mechanism.*

*25. The cupholder of claim 24 wherein the mounting bracket includes at least one fastener opening.*

* * * * *

UNITED STATES PATENT AND TRADEMARK OFFICE

CERTIFICATE OF CORRECTION

PATENT NO. : RE 39,392 E
APPLICATION NO. : 10/985831
DATED : November 14, 2006
INVENTOR(S) : Peter W. A. Bergin It is certified that error appears in the above-identified patent and that said Letters Patent is hereby corrected as shown below:

Column 1, line 8, before the heading "BACKGROUND OF THE INVENTION" insert:

--Notice: More than one reissue application has been filed for the reissue of patent 6,641,101. The reissue applications are 11/474,913 and 10/985,831.--.

Signed and Sealed this

Twenty-ninth Day of June, 2010

David J. Kappos

David J. Kappos
*Director of the United States Patent and Trademark Office*